United States Patent [19]

Priefert

[11] Patent Number: 5,368,121
[45] Date of Patent: Nov. 29, 1994

[54] TELESCOPING TRACTOR FRAME

[76] Inventor: William D. Priefert, Drawer 1540, Mt. Pleasant, Tex. 75455

[21] Appl. No.: 78,344

[22] Filed: Jun. 21, 1993

[51] Int. Cl.$^5$ .................... B62D 61/12; B62K 13/00
[52] U.S. Cl. .................... 180/209; 180/900; 280/638; 280/111; 280/786
[58] Field of Search .......... 180/209, 7.1, 900; 280/638, 111, 786, 798

[56] References Cited

U.S. PATENT DOCUMENTS

| | | | |
|---|---|---|---|
| 1,202,472 | 10/1916 | Binford | 280/111 |
| 2,675,247 | 4/1954 | Meng | 280/111 |
| 3,526,289 | 9/1970 | Rodgers | 180/7.1 |
| 3,954,198 | 5/1976 | Sedelmayer | 280/638 |
| 4,611,683 | 9/1986 | Hilmer | 180/209 |
| 5,020,627 | 6/1991 | Wittke | 180/900 |

FOREIGN PATENT DOCUMENTS 1465891 3/1977 United Kingdom ............ 280/638

Primary Examiner—Kenneth R. Rice
Attorney, Agent, or Firm—Kent A. Herink; Brian J. Laurenzo; Brett J. Trout

[57] ABSTRACT

A telescopic tractor frame comprised of two interconnected cylindrical frame members which allow the frame to extend a contract and to pivot horizontally along the frame's axis. The frame may be extended to carry large loads or contracted to increase maneuverability. The frame may also be extended and contracted repeatedly to extricate the tractor from muddy or boggy soil.

3 Claims, 2 Drawing Sheets

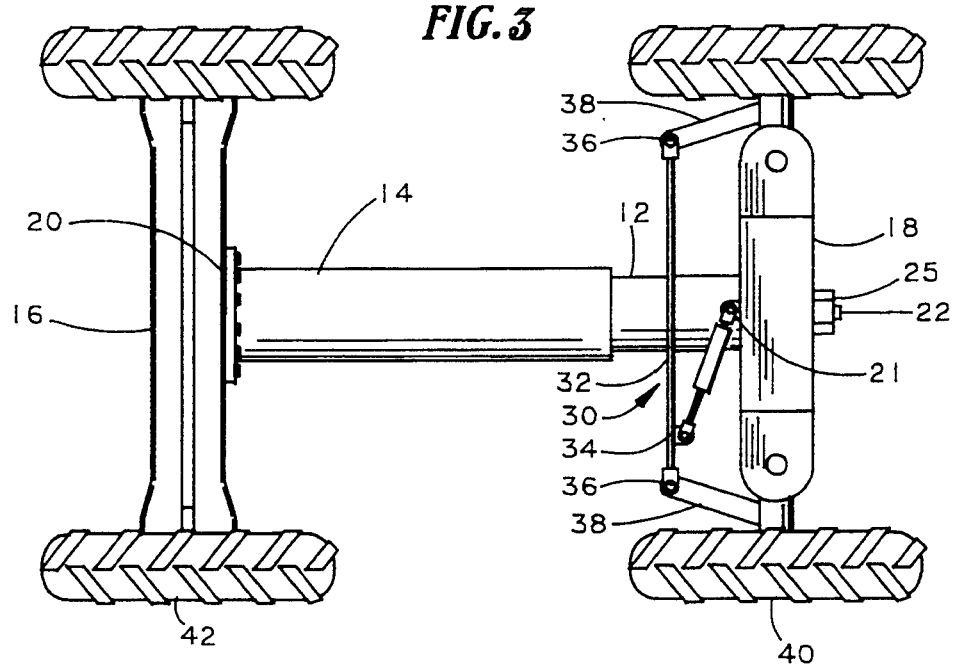
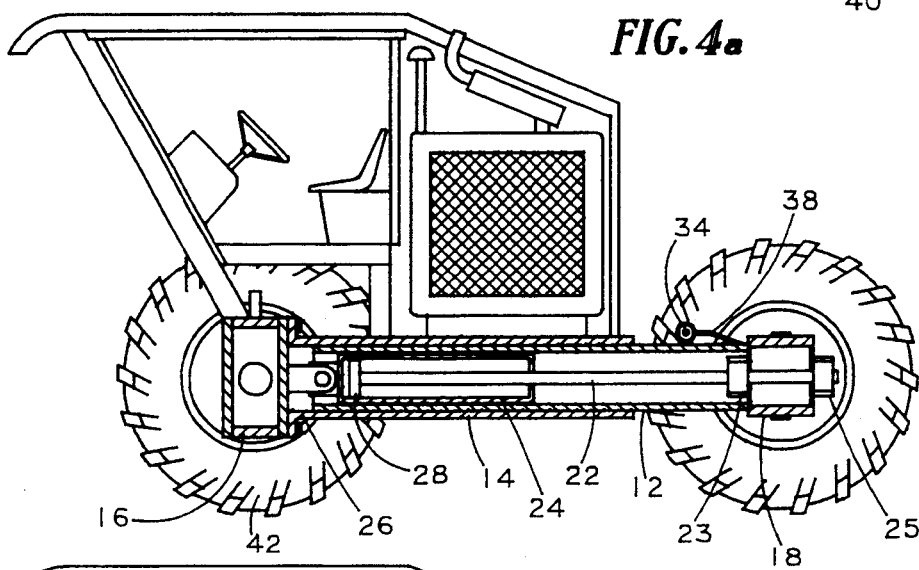
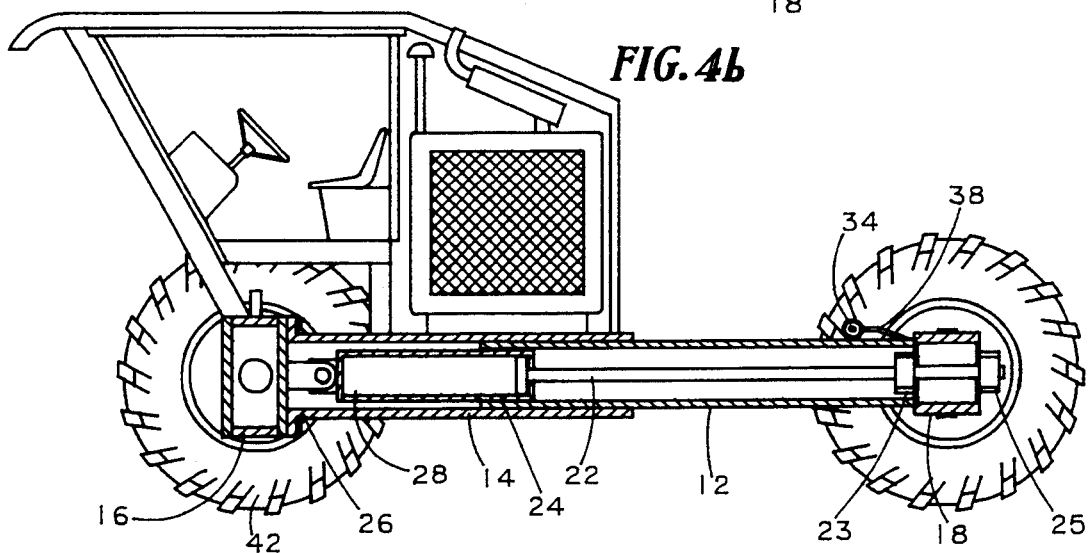

TELESCOPING TRACTOR FRAME

BACKGROUND OF THE INVENTION

The present invention relates generally to tractor frames and, more particularly, to telescopic tractor frames which act to increase or decrease the wheel base of a tractor.

Modern tractors have various features designed for different applications. Pulling or carrying large loads generally requires either counter-balanced tractors or tractors which longer wheel bases. Counter-balanced tractors have the disadvantage of increased fuel consumption, increased tire wear and additional ground compaction while tractors with longer wheel bases have the disadvantage of decreased maneuverability. Tractors with shorter wheel bases have the disadvantages of a smaller load capacity as well as decreased ground following ability when working in a field. Additionally, neither long nor short wheel based tractors work well on extremely uneven ground or very muddy or boggy ground. Furthermore, it is neither time nor cost efficient to switch between long and short wheel based tractors for different applications.

Accordingly, it is desirable to provide a four-wheel-drive tractor with a telescopic tractor frame. It is also desirable to provide a tractor with a frame which swivels to keep all four wheels in contact with the ground.

A number of attempts have been made to provide a vehicle with a telescopic frame. These telescopic frames usually have some very particular application and are generally not suitable for other more general applications.

U.S. Pat. No. 4,611,683 discloses a farm tractor with a telescoping frame. However, the telescopic frame shown in this patent is designed merely to allow the operator to drive the tractor over an implement to hitch the implement to the center of the tractor. The tractor's longitudinal extension is not suitable for increasing load handling capabilities nor to extricating the tractor from muddy or boggy terrain.

Likewise, none of the prior art devices disclose a longitudinally telescopic tractor frame suitable for use in extricating the vehicle from muddy or boggy situations while allowing the back axis to rotate longitudinally in relationship to the front axis.

The difficulties in the prior art longitudinally telescopic frames are substantially eliminated by the present invention.

SUMMARY OF THE INVENTION

Accordingly, it is an object of the present invention to provide a telescopic tractor frame wherein the length of a tractor's wheelbase can be adjusted during driving operation of a tractor by operation of a hydraulic cylinder or the like.

It is another object of the present invention to provide a longitudinally telescopic tractor frame wherein the rear axle of the tractor can swivel longitudinally in relationship to the front axle of the tractor in response to varying topography.

It is still another object of the present invention to provide a longitudinally telescopic tractor frame which can increase load carrying capacity or maneuverability in response to specific applications.

Yet another object of the present invention is to provide a longitudinally telescopic tractor frame in which the driver may increase the wheelbase of the tractor to improve ground following characteristics of the tractor or an implement being pulled.

Still another object of the present invention is to provide a telescopic tractor frame to reduce ground compaction by a tractor.

By the present invention, it is proposed to overcome the difficulties encountered heretofore. To this end, a vehicle frame is provided having a first frame section with a first longitudinal member and a second frame section having a second longitudinal member. The two longitudinal members are operably connected so that the second frame section may pivot and telescope in relationship to the first frame section.

Preferably the frame sections are T-shaped with two of the ends of the T-shaped frames being connected to wheels and the remaining end being cylindrical and nested with the cylindrical end of the opposing frame section. This nesting allows the frame sections to pivot and telescope to increase wheel traction and assist in extricating the vehicle from on extremely rough terrain.

BRIEF DESCRIPTION OF THE DRAWINGS

In the drawings:

FIG. 3 is a bottom view of a telescopic tractor frame connected to four tractor ties and a steering means.

FIGS. 4a and 4b illustrate a cross sectional view of a tractor incorporating the telescopic frame of the present invention in both the fully contracted and fully extended positions.

DETAILED DESCRIPTION OF THE INVENTION

Figure 1:
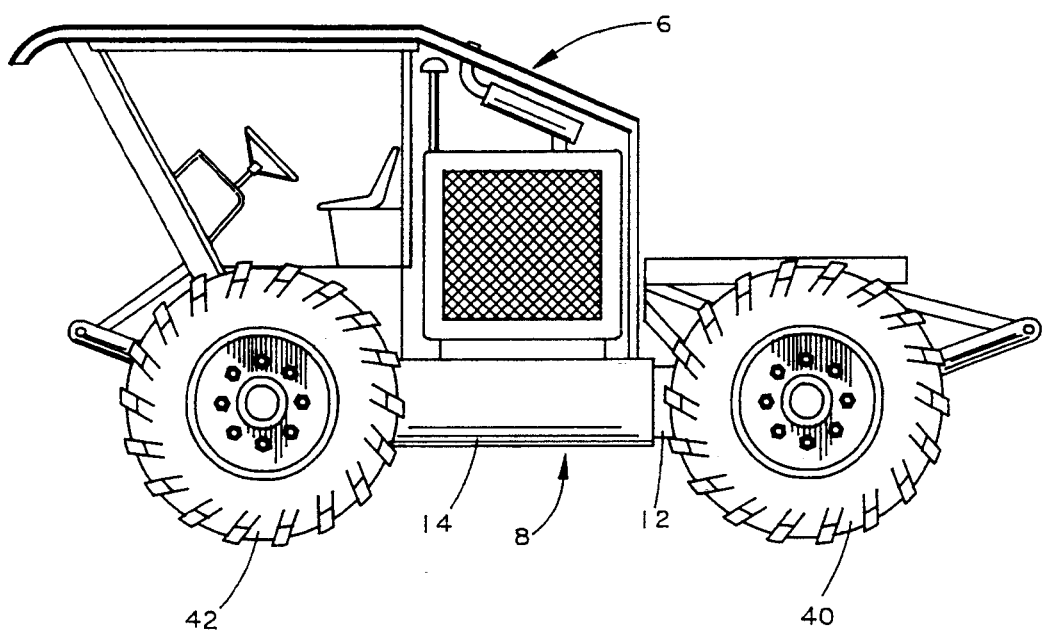
FIG. 1 is a side elevational view of a tractor incorporating the telescopic frame of the present invention.
Figure 2:
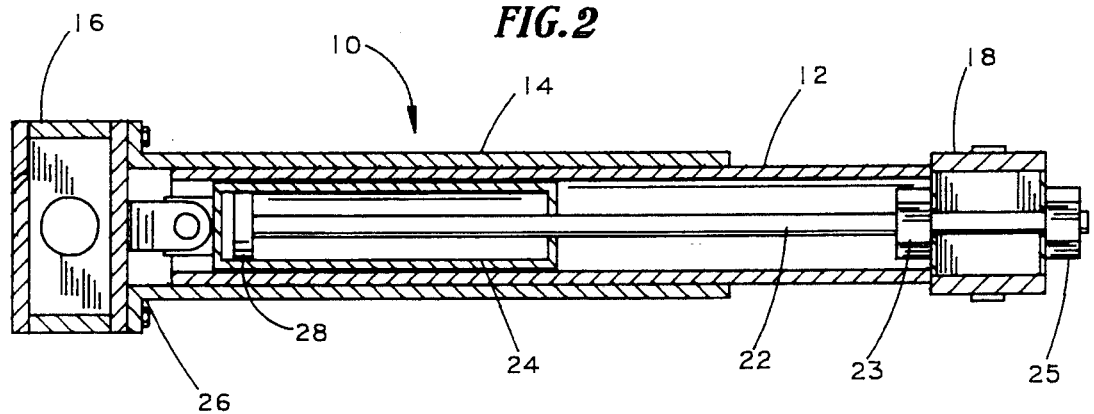
FIG. 2 is a side cross sectional view of the telescopic frame.

In the Figures, a tractor 6 with longitudinally telescopic frame 68 is shown generally at FIG. 1. The frame 6 improves the balancing of loads, increases the maneuverability of the tractor 6, increases the capacity of the tractor 6 and allows the tractor 6 to more easily maneuver out of muddy or boggy terrain.

In the preferred embodiment, the tractor's frame 8 consists of a longitudinal support member 10, a forward transverse member 16, and a rearward transverse member 18 (FIG. 1). The longitudinal support member 10 is comprised of a forwardly extending longitudinal member 12 and a rearwardly extending longitudinal member 14. Thus, the tractor's longitudinal support member 10 acts as a telescopic support for the tractor frame while allowing the forward and rearward transverse members shown at 16 and 18 to swivel horizontally in relationship to one another. The rearwardly extending longitudinal member 14 is connected to the central portion of the forward transverse member 16 shown at 20. The forwardly extending longitudinal member 12 is connected to the central portion of the rearward transverse member 18 shown at 21.

A piston member 22 runs concentrically through the center of the forwardly extending longitudinal member 12 and is connected to the sides of the rearward transverse member 18 by a pair of nut 23 and 25. A hydraulic tube section 24 is mounted within the rearwardly extending longitudinal member 14 and has an outer circumference which is slightly smaller than the inner circumference of the forwardly extending longitudinal member 12 so that the section 24 fits easily into the forwardly extending longitudinal member 12 as the frame 8 retracts. The hydraulic tube section attachment member 26 allows the hydraulic tube section 24 to be attached within the forwardly extending longitudinal member 12 when the forwardly extending longitudinal member 12 is inserted within the rearwardly extending longitudinal member 14. This attachment member 26 allows hydraulic force to act upon the piston member 22 without preventing telescopic or swivel movement of the tractor's longitudinal support member 10. The hydraulic tube section attachment member 26 rests within the rearwardly extending longitudinal member 14 and is attached centrally to the forward transverse member 16.

To decrease the wheelbase of the tractor hydraulic fluid is drawn out of the hydraulic tube section 24. This draws the piston member 22 toward the front of the hydraulic tube section 24 which pulls the forwardly extending longitudinal member 12 and rearward transverse member 18 with it. The fully contracted longitudinal support member position is shown in FIG. 4a.

To increase the wheelbase of the tractor, hydraulic fluid is forced into the forward portion of the hydraulic tube section 24 thereby forcing the piston member 22 toward the rear of the tractor. The rearward end of the hydraulic tube section 24 prevents the head of the piston member 28 from being pushed completely out of the hydraulic tube section. The fully extended longitudinal support member position is shown in FIG. 4b.

Another feature of the preferred embodiment is the steering mechanism 30 shown in FIG. 3. A hydraulic steering piston 32 is pivotally attached at one end to the rearward transverse member 18 and at the other end to a metal rod 34 which serves as a control arm for the steering mechanism 30. The metal rod control arm 34 is connected by means of pins 36 to tie rods 38. The pins 36 pass through both the metal rod 34 and the tie rods 38 which allows the tie rods 38 to pivot in relationship to the metal rod. The opposite end of the tie rods 38 are connected for pivotal movement to the tractor wheels 40 and 42. As hydraulic fluid is forced in and out of the hydraulic tube section 32 the metal rod/control arm 34 moves perpendicularly in relationship to the forwardly extending longitudinal member 18. This perpendicular movement of the metal rod/control arm 34 pushes and pulls the tie rods 38 away from and toward the forwardly extending longitudinal member 18 which translates via the tie rods 38 pivotal connection to the tractor wheels 40 and 42 into the wheels 40 and 42 turning either left or right.

The tractor 6 may be used to operate over very rough or uneven terrain. Because the forward transverse member 16 can pivot in relationship to the rearward transverse member 18, the tractor may maintain all four wheels 40 and 42 on the ground to maintain maximum traction. In the prior art, tractors often encountered situations where the terrain near the front axle sloped significantly differently than the terrain near the rear axle. This difference in slopes often caused one or two wheels of the tractor to leave the ground thereby decreasing traction and destabilizing the tractor. The independently pivotal transverse members 16 and 18 of the present invention alleviate this problem by allowing each transverse member 16 and 18 to contour to the slope of the terrain nearest that member 16 and 18.

Additionally, in situations where the terrain is extremely muddy or boggy, the tractor 6 can be sued in a worm-like fashion to move the tractor 6 across the terrain. Typically four-wheel-drive vehicles will not stop moving until all four wheels have dug into the soil deeply enough so that the frame of the vehicle contacts the ground and becomes "bottomed out." After bottoming out further spinning of the wheels of a prior art four-wheel-drive vehicle is of little use as the frame rests on the ground and prevents the wheels from obtaining traction.

In the present invention, the tractor 6 may proceed across a muddy or boggy area until the wheels 40 and 42 become entrenched in holes deep enough to bring the frame 8 into contact with the ground. To extricate the tractor 6 the frame 8 is retracted as all four wheels 40 and 42 are driven. The retraction of the frame causes the rear wheels 40 to contact the front of the furrows cut by the rear wheels 40 while the front wheels 42 contact the rear of the furrows cut by the front wheels 42. Because all four wheels 40 and 42 are rotating in the forward direction, the rear wheels 40 drive up and out along the front of the rear furrows, while the front wheels 42 act as a brace by digging into the front furrows.

When the tractor 6 becomes stuck again, the frame 8 is then extended which causes the rear wheels 40 to press against the rear of the furrows cut by the rear wheels 40, while the front wheels 42 press against the front of the front furrows. Because all four wheels 40 and 42 are rotating in the forward direction the front wheels 42 drive up and out along the front of the front furrows while the rear wheels 40 act as a brace by digging into the rear furrows. This action continues as the tractor 6 moves across the terrain in a worm-like fashion.

The foregoing description and drawings merely explain and illustrate the invention and the invention is not limited thereto, except insofar as the claims are so limited, as those skilled in the art who have the disclosure before them will be able to make modifications and variations therein without departing from the scope of the invention. For example, while the preferred embodiment shows a steering mechanism only for the back of the vehicle, a forward steering mechanism, a dual steering mechanism controlling both the forward and rear tires, or any suitable steering mechanism are all anticipated.

I claim:

1. An extendable tractor having a frame capable of extending and pivoting in response to various terrains comprising:
   a. a forward wheel support;
   b. a forward cylinder with an inner circumference, said forward cylinder being perpendicularly attached to said forward wheel support;
   c. a rear wheel support;
   d. a rear cylinder with an outer circumference, said rear cylinder being perpendicularly attached to said rear wheel support, said rear cylinder also being nested within said forward cylinder for telescopic and pivotal movement in relationship thereto;
   e. a first pair of wheels operably connected to said forward wheel support;
   f. a second pair of wheels operably connected to said rear wheel support; and
   g. a hydraulic linear actuator attached within said forward cylinder and attached within said rear cylinder to extend and contract said forward cylinder in relationship to said rear cylinder while allowing said forward cylinder to pivot in relationship to said rear cylinder.

2. A method of operating over terrain a vehicle having wheels and a forward frame section pivotally and telescopically connected to a rearward frame section, comprising the steps of:
   (a) pivoting the first frame section in relationship to the second frame section to maintain the wheels in substantially constant contact with the ground; and
   (b) telescoping the first frame section in relationship to the second frame section to prevent the wheels from losing traction.

3. A method of operating over terrain a vehicle having wheels and a forward frame section pivotally and telescopically connected to a rearward frame section, comprising telescoping the first frame section in relationship to the second frame section to gain traction when the vehicle loses traction.

* * * * *